Sept. 28, 1943.  F. N. FOSSATI  2,330,432

WEIGHT INDICATOR

Filed Feb. 6, 1942

INVENTOR
Francis N. Fossati
By  *JMAdams*
ATTORNEY

Patented Sept. 28, 1943

2,330,432

UNITED STATES PATENT OFFICE 2,330,432

WEIGHT INDICATOR

Francis N. Fossati, El Cerrito, Calif., assignor to Standard Oil Company of California, San Francisco, Calif., a corporation of Delaware Application February 6, 1942, Serial No. 429,797

3 Claims. (Cl. 265—1)

This invention relates to a force measuring device for variable loads, and particularly refers to a weight indicator for a well drilling system to indicate to the operator the weight of the drilling tools.

Heretofore weight indicators of this type have utilized means primarily responsive to compression and therefore adapted to be shortened under the load imposed by the drilling tools. In order to obtain the strength required to resist the heavy loads imposed, particularly when pulling the drill pipe out of the well, these devices were necessarily relatively insensitive. They were also subject to frequent and unpredictable overloads which would either damage the indicating equipment or set up permanent deformations in the load responsive system.

This invention comprehends broadly a weight indicator in which the force is so applied as to elongate a member having spaced abutments, with an extensible force responsive means placed between the abutments and a separate resilient means adapted to keep the force responsive means in contact with the abutments, the resilient means exerting the total loading force that can be imposed upon the force responsive means. By this construction an extremely sensitive and relatively delicate force responsive means may be used and may be so adjusted that it will give an indication within certain predetermined ranges of load, without the possibility of overstressing or detracting from its inherent accuracy.

There are three general locations on and about a well drilling rig where a weight indicator may be placed, namely, the crown block at the top of the derrick, the traveling block which directly supports the drilling tools, and the so-called deadline where the inactive end of the cable system is secured to the derrick structure. Desirably but not necessarily, this present invention may be applied to either of the two latter locations, and preferably to the traveling block, the bails for the swivel or associated with the hook which supports the swivel. The example of this specification will describe and illustrate the invention as applied to a separate yoke which may be used to secure the dead-line to its anchorage or may be placed between the traveling block hook and the swivel. Obviously, a suitable modification could be devised to be placed within either or both of the bails of the swivel or within the hollow shank of the hook itself.

It is an object of this invention to provide a force responsive means particularly adapted to measure heavy and varying tension loads to a high degree of accuracy.

Another object is to provide a weight indicator for a well drilling system which is more accurate and reliable, as well as more economical to fabricate than those previously used.

Another object is to provide an improved mechanism for connecting a force responsive means into a tool suspension system for a well drilling rig or the like.

These and other objects and advantages will be more fully apparent from the following description and from the appended drawing which forms a part of this specification and illustrates a preferred embodiment of the invention as it is applied to a tension measuring member. In the drawing.

Figure 3:
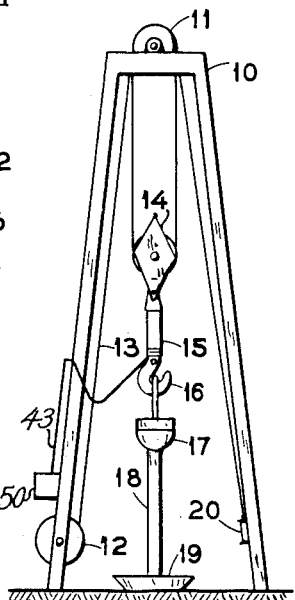
Figure 3 is a diagrammatic vertical elevation view of the weight indicator of Figures 1 and 2 applied to a well drilling rig.

Referring to the drawing and particularly to Figure 3, reference numeral 10 indicates generally an oil well derrick provided with a crown block 11 at its upper end and a hoisting drum 12 at one side, the latter adapted to draw in or pay out cable 13 which passes over crown block 11 and thence around traveling block 14 the required number of times to obtain the desired mechanical advantage. In this example the weight indicator means generally designated 15 is supported immediately below traveling block 14 and terminates in a hook 16 adapted to engage the bails of a swivel 17 which in turn supports the kelly 18 to which the drilling tools (not shown) are attached. Kelly 18 may be rotated as by rotary table 19 in the usual manner. The so-called dead end of cable 13 passes downwardly on the opposite side of crown block 11 from hoist 12 and terminates at one side of derrick 10 in a clamp 20 anchored to the derrick structure or to its foundation. Alternatively, weight indicator 15 could be secured immediately above clamp 20. This location, however, is not as desirable as that shown below travel block 14 because of the friction forces involved in the suspension system including the several turns of cable passing around crown block 11 and traveling block 14.

Figure 1:
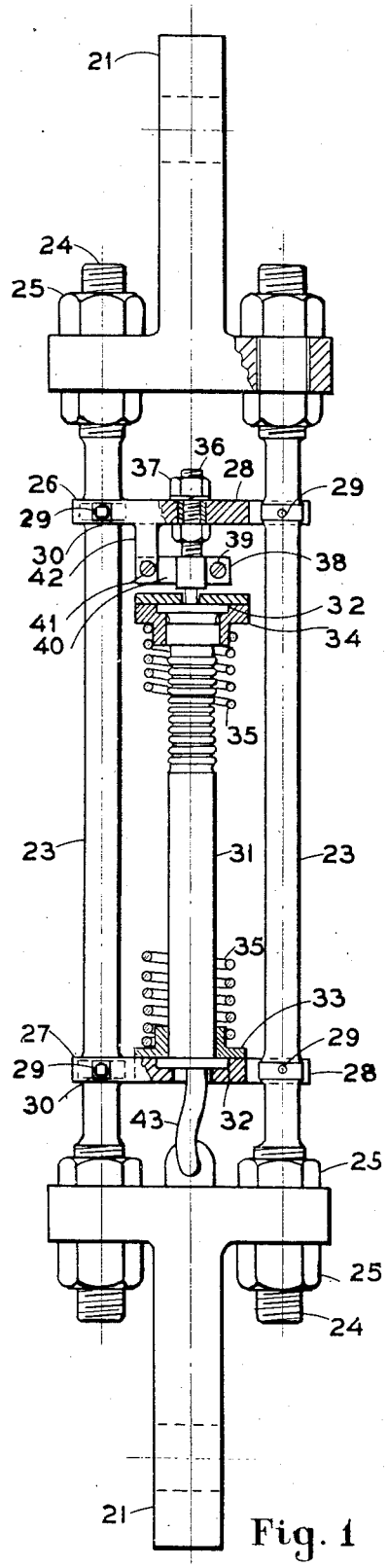
Figure 1 is a longitudinal and part sectional view of a tension indicator embodying this invention.
Figure 2:
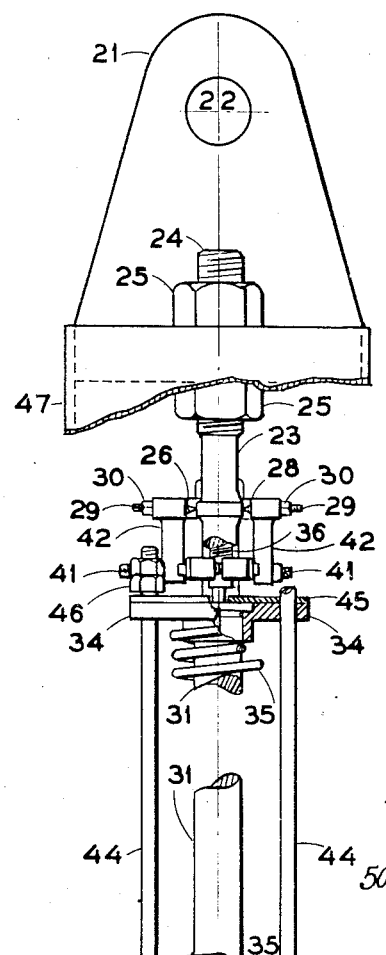
Figure 2 is a longitudinal and part sectional view in a plane at right angles to the view of Figure 1.

Referring now to Figures 1 and 2 which illustrate in some detail the construction of this example of the invention, reference numeral 21 designates similar upper and lower connecting links, each provided with a hole 22, by means of which they may be attached to the system in which the weight is to be measured. In order to obtain a truly balanced structure and avoid offsets and bending stresses, links 21 are preferably connected by means of duplicate elongated members 23 provided with threads 24 and secured by nuts 25. Elongated members 23 are preferably made of a suitable heat-treated alloy steel and are carefully machined so that they are of the same dimensions. Intermediate the ends of members 23 are upper and lower yokes 26 and 27, each end of each yoke being bifurcated as at 28 and provided with opposed threaded pivot points 29 which engage members 23 at diametrically opposed points, the outer ends of pivot points 29 being fitted with lock nuts 30. These connecting yokes 26 and 27 form opposed abutments between which a force responsive means, to be described below, may be positioned. As elongated members 23, which could equally be formed integral with links 21 or could be in the shape of a single tubular or other type of cross-section, increase in length due to a tensile force exerted between links 21, yokes 26 and 27 will mutually recede proportionally to the stress set up therein according to well known physical laws.

In this example, a desirable type of force responsive means is the apparatus shown in United States Patent No. 2,036,458, issued April 7, 1936, to R. W. Carlson. This device has certain advantages as to temperature compensations, size and sensitivity but, like other desirable types of force responsive means, can be damaged by overstressing. In order to prevent such overstressing, means are provided whereby the actual force exerted between links 21 is not directly transmitted to the force responsive means but the latter is loaded by separate and independent resilient means which are predetermined to give a maximum force which will not exceed the safe loading value of the force responsive means.

In this example, reference numeral 31 designates such force responsive means, such as the Carlson strain gauge which is provided at both ends with flanges 32. Lower flange 32 is received in a recess in yoke 27 and is secured therein by means of a collar 33, the latter preferably being longitudinally split so that it may be applied around the gauge after its assembly. A similar collar 34 is mounted at the upper end of gauge 31 and is similarly split. Between collars 33 and 34 are expansible resilient means such as the helical spring 35, the latter tending to elongate gauge 31 through its small range of motion by a substantially constant force acting upon its flanged ends 32.

In order to provide for close adjustments between yokes 26 and 27 and gauge 31, a coaxial stud 36 is provided through upper yokes 26 and is adapted to be locked in position by means of nuts 37. Desirably but not necessarily, a slow-motion arrangement is provided so that threaded stud 36 may be given a slight and controlled degree of rotation within yoke 26. In this example this is accomplished by a split collar 38 adapted to be clamped around an unthreaded portion of stud 36 by means of screw 39. An extension 40 of collar 38 projects at right angles to the axis of stud 36 and is received between two adjusting screws 41, the latter mounted in opposed lugs 42 which extend downwardly at each side of one end of upper yoke 26. By loosening lock nuts 37 and clamping collar 38 to stud 36, a very accurate adjustment between the lower end of stud 36 and the top flange 32 of gauge 31 may be obtained, by rotating screws 41 which bear upon the side extension 40 of clamp 38. After this adjustment is obtained, lock nuts 37 may be tightened to hold stud 36 in its desired position. By such a procedure force responsive means 31 may be so positioned between abutment means 26 and 27 that it will indicate zero or any desired value within its range for a predetermined initial stress on elongated members 23, desirably within the safe working range of the latter, for purposes well known in this art.

It will be apparent from the foregoing that, when a tensile force is exerted between links 21, elongated members 23 will be increased in length, thereby separating the upper yoke 26, which is pivotally connected to members 23 by pivot points 29, from lower yoke 27 which is similarly connected to members 23 at a spaced distance from the upper yoke. Stud 36 will tend to move away from the upper face of flange 32 at the upper end of the force responsive means 31. Spring 35, however, will elongate force responsive means 31 so that it will remain controllably in contact with stud 36 throughout its predetermined range of motion. In this example, where a Carlson gauge is used, the internal electrical resistance of the two arms or windings of the Carlson gauge will be respectively increased and decreased, as is pointed out in detailed in that patent, this indication being transmitted out of the gauge through connectors 43 to a suitable resistance measuring or comparing means 50, for example a recording Wheatstone bridge, as is well known in this art.

Desirably, but not necessarily, means may be provided to limit the elongation which spring 35 will impose upon force responsive member 31, said means comprising opposed rods 44 (Figure 2) which pass through suitable apertures in lower yoke 27 and through upper collar 34 and cover plate 45, desirably on a diametral axis at right angles to that of elements 23. Nuts 46 are threaded to the upper and lower ends of rods 44 and may be adjusted as desired to limit the elongation of force responsive means 31 under the force of spring 35.

In order to minimize the effect of weather, temperature changes and the like on the force responsive means 31 or on the rest of the structure, a jacket or case 47 may be secured to one of yokes 26 or 27 by means such as screws 48. The opposite end of jacket 47 should be unsecured, so as to move freely with respect to the link 21 and not take any of the stress from members 23.

This example illustrates a tension measuring application of the invention, but it is obvious that, if a compression force is to be measured, suitable well known linkages may be used to convert all or any desired part of said force to a proportional elongation or separation of the stressed parts so that an extensible force responsive means is usable.

Although this example illustrates the extensible force responsive means positioned between abutments which are intermediate the ends of two elongated members adapted to be stressed by the force or weight to be measured, it is obvious that numerous modifications and changes could be made without departing from the invention. Other possible modifications will be obvious to those skilled in this art and all such changes that come within the scope of the appended claims are embraced thereby.

I claim:

1. A weight indicator for a well drilling system comprising a pair of parallel elongated members connected together at their outer ends and adapted to be connected in the weight supporting system of a drilling rig; means forming a pair of spaced abutments intermediate the ends of said members each said abutments spanning the elongated members and being pivotally connected at each of its ends thereto; an extensible and contractible force responsive means positioned between said abutment means, so constructed and arranged as to be responsive to a predetermined elongation and contraction of said parallel elongated members between their pivotal connections to said abutments, the longitudinal axes of said elongated members and said force responsive means lying in a single plane, said force responsive means being coaxial with the direction of the force applied to said indicator; and an indicating means for said force responsive means.

2. A weight indicator according to claim 1 in which said spaced abutment means comprise yokes having bifurcated ends to straddle said elongated members to provide a symmetrical and balanced connection thereto.

3. A weight indicator according to claim 1 with the addition of means for limiting the deflection of said force responsive means independently of said abutment means to prevent damage to said force responsive means by loads exceeding the rated value of said weight indicator.

FRANCIS N. FOSSATI.